(12) United States Patent
Caine et al.

(10) Patent No.: US 6,619,596 B1
(45) Date of Patent: Sep. 16, 2003

(54) RV SEWER HOSE SUPPORT

(76) Inventors: Donald R. Caine, 5308 Dorchester Rd., Greensboro, NC (US) 27407; William T. Brockington, 752 Eagle Point Dr., Kernersville, NC (US) 27284; Anthony D. Moore, 7934 Highfill Rd., Summerfield, NC (US) 27358; Norman P. Geible, 6150 Habersham Dr., Kernersville, NC (US) 27284

( * ) Notice: Subject to any disclaimer, the term of this patent is extended or adjusted under 35 U.S.C. 154(b) by 0 days.

(21) Appl. No.: 10/137,075

(22) Filed: May 2, 2002

(51) Int. Cl.[7] .................................................. F16L 3/00
(52) U.S. Cl. ............................. 248/49; 248/83; 138/106
(58) Field of Search ............................. 248/49, 75, 80, 248/83, 148, 150; 138/106

(56) References Cited

U.S. PATENT DOCUMENTS

| | | | | |
|---|---|---|---|---|
| 3,493,204 A | | 2/1970 | Prouty | |
| 3,809,348 A | * | 5/1974 | Di Laura | 248/49 |
| 3,819,137 A | | 6/1974 | Smith | |
| 4,082,242 A | | 4/1978 | Smith | |
| 4,169,571 A | | 10/1979 | Duggan | |
| 4,228,978 A | * | 10/1980 | Rand | 248/49 |
| 4,406,434 A | | 9/1983 | Schneckloth | |
| 4,722,500 A | | 2/1988 | Bray | |
| 4,844,121 A | | 7/1989 | Duke | |
| 5,431,455 A | | 7/1995 | Seely | |
| 6,186,449 B1 | * | 2/2001 | Chrestenson | 248/49 |

* cited by examiner

Primary Examiner—Anita King

(57) ABSTRACT

A collapsible support is provided for a flexible RV sewer hose which includes in the preferred form, a plurality of pairs of identical arches. The height of each arch pair is different from the preceding arch pair to allow a sewer hose placed therein to properly flow by gravitational forces from the RV to a septic system. The arches of the support are hinged along the side so that each arch will cradle the sewage hose at an angle to the longitudinal axis of the sewer hose.

15 Claims, 5 Drawing Sheets

RV SEWER HOSE SUPPORT

FIELD OF THE INVENTION

The invention herein pertains to a support for a recreational vehicle (RV) flexible sewer hose and particularly pertains to a support which can be expanded for use and contracted for storage and transportation purposes.

DESCRIPTION OF THE PRIOR ART AND OBJECTIVES OF THE INVENTION

The ownership and use of RVs has dramatically increased in recent years with parks and other facilities witnessing greater RV traffic. Such parks generally furnish a sewage hose stub joined to a septic system for each parking space to permit connection with the RV sewer hose. Once the sewer hose is affixed to the stub, the RV holding tank can be drained, sewage collected and processed by the septic system as required in each locale. In order to adequately direct the flow of sewage from the RV, the sewer hose must be angularly disposed so that the flow of sewage by gravitational forces will be sufficient. Accordingly, various types of trestles, stakes, supports, legs and the like have been developed in the past to ensure that the RV sewer hose is properly biased for sufficient grade and flow. Such prior attempts at supporting a sewer hose have met with problems as some supports require very precise placement and adjustment to function properly. Other sewer hose supporting devices are costly and require much manual dexterity and skill by the RV owner in the assembly, setup and connection.

Thus, with the problems and difficulties associated with present RV sewer hose supports, the present invention was conceived and one of its objectives is to provide a support which will ensure a proper grade for the sewer hose.

It is another objective of the present invention to provide a sewer hose support which is easy to open and simple to use by those with relatively little manual dexterity.

It is still another objective of the present invention to provide a sewer hose support which can be easily extended for use and which can be quickly collapsed or closed for storage and transportation.

It is yet another objective of the present invention to provide a sewer hose support which is durable and unaffected by adverse weather conditions.

It is a further objective of the present invention to provide a sewage hose support which is relatively inexpensive to manufacture and purchase.

Various other objectives and advantages of the present invention will become apparent to those skilled in the art as a more detailed description is set forth below.

SUMMARY OF THE INVENTION

The aforesaid and other objectives are realized by providing a sewer hose support which includes a plurality of arches which are hingedly joined, one to another along adjacent sides. The arches are molded of a lightweight, durable plastic with a hinge ultrasonically welded along the sides for expanding and contracting the support as needed. Thus, the hose support can be manually folded or unfolded as required in a simple, easy and efficient manner. Each hose support arch includes a deep cradle for securely containing the sewer hose during periods of rapid sewage flow and includes a leg affixed to each end of the cradle. A transverse brace is positioned below the cradle which is joined to each leg. Thus, in the preferred form, pairs of identical sized arches are connected to adjacent pairs of arches of lesser height as viewed from the RV, outwardly. The drop or grade of the sewer hose is about 3⅛" (7.93 cm) along the length of the hose support while expanded. Thus, the support contains the flexible sewer hose in a biased manner, ensuring proper sewage flow.

When ready for use, the sewer hose support is opened (expanded), placed on the ground between the RV and sewage stub and a flexible sewer hose is placed in the cradles of the arches with the tallest arch being closest to the RV. Each cradle is sufficiently deep and thus supports a linear sewer hose at an angle of approximately 30° to the longitudinal axis of the sewer hose, thereby providing adequate support. The sewer hose is then connected to the RV holding tank at one end and to the sewage stub at the other. When the RV is to be moved and use of the hose support is complete, the sewer hose is lifted from the support and the support collapsed into a compact posture so it can be easily stored along with the sewer hose for future use. The sewer hose is disconnected from the RV holding tank and from the sewage stub, rinsed and stored in the hose compartment of the RV.

DETAILED DESCRIPTION OF THE PREFERRED EMBODIMENTS AND OPERATION OF THE INVENTION

Figure 1:
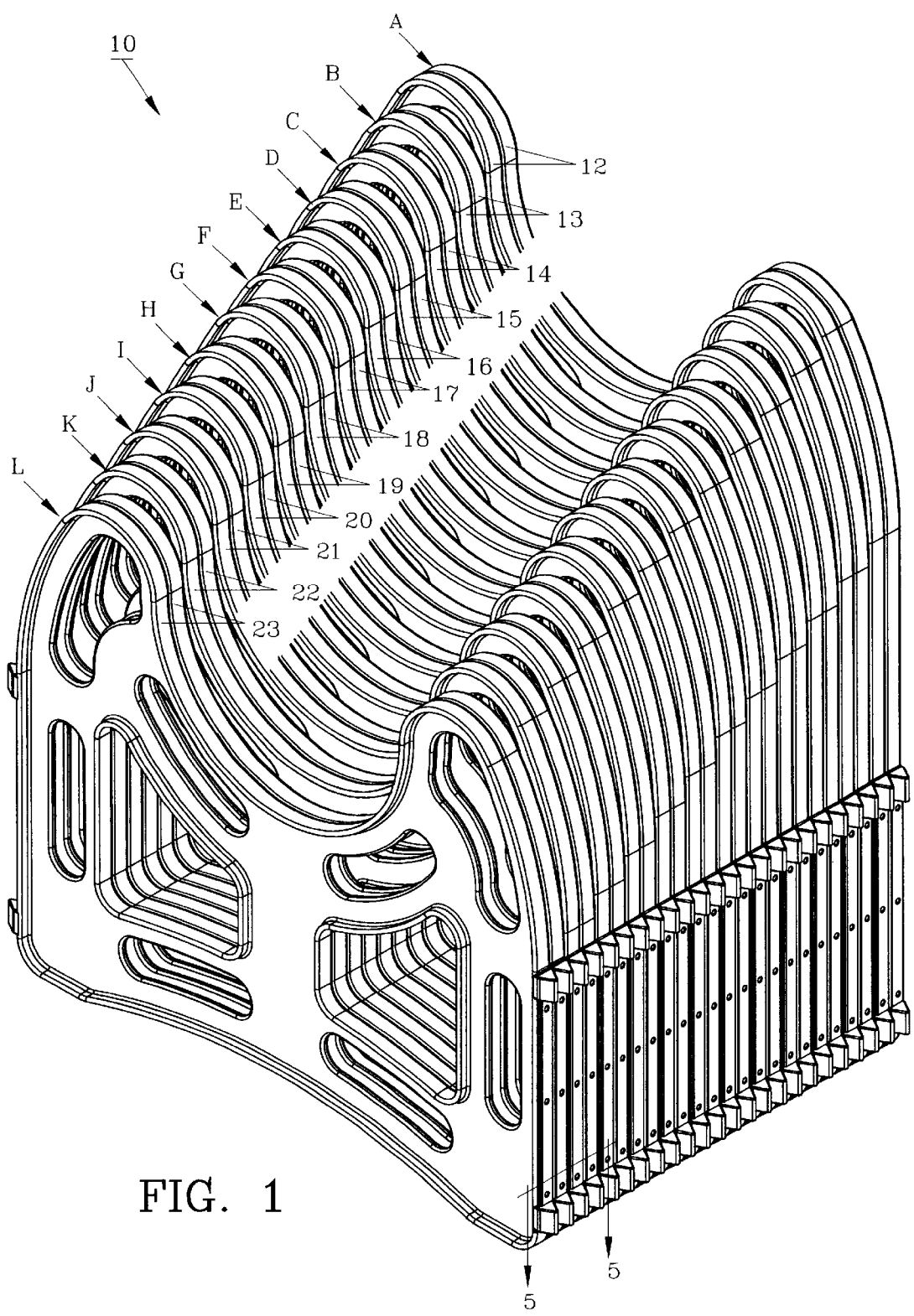
FIG. 1 demonstrates the preferred form of the invention in a closed posture.

For a better understanding of the invention and its use, turning now to the drawings, FIG. 1 shows preferred sewer hose support 10 in a collapsed posture as when not in use, such as during storage, transportation and the like. Sewer hose support 10 includes a plurality of, preferably twelve pairs of arches A, B, C, D, E, F, G, H, I, J, K and L, each pair having two identical arches. Each pair of arches has a slightly different height to support a sewer hose (not shown in FIG. 1) on a bias for proper drainage. Pair A has a height of 10"(25.4 cm) whereas pair L has a height of only 6⅞" (17.33 cm).

Figure 2:
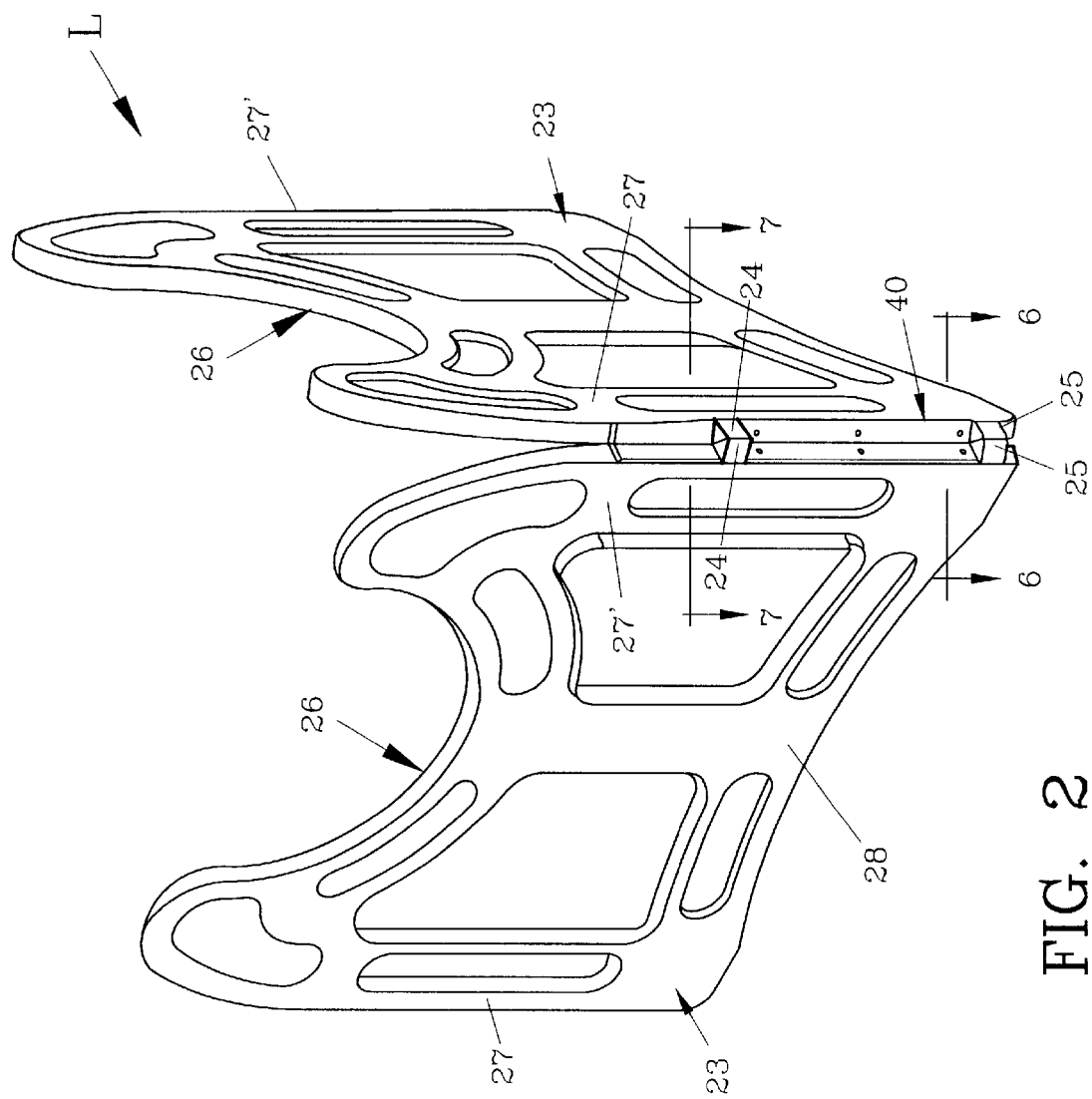
FIG. 2 shows a pair of open arches as removed from the hose support seen in FIG. 1.
Figure 3:
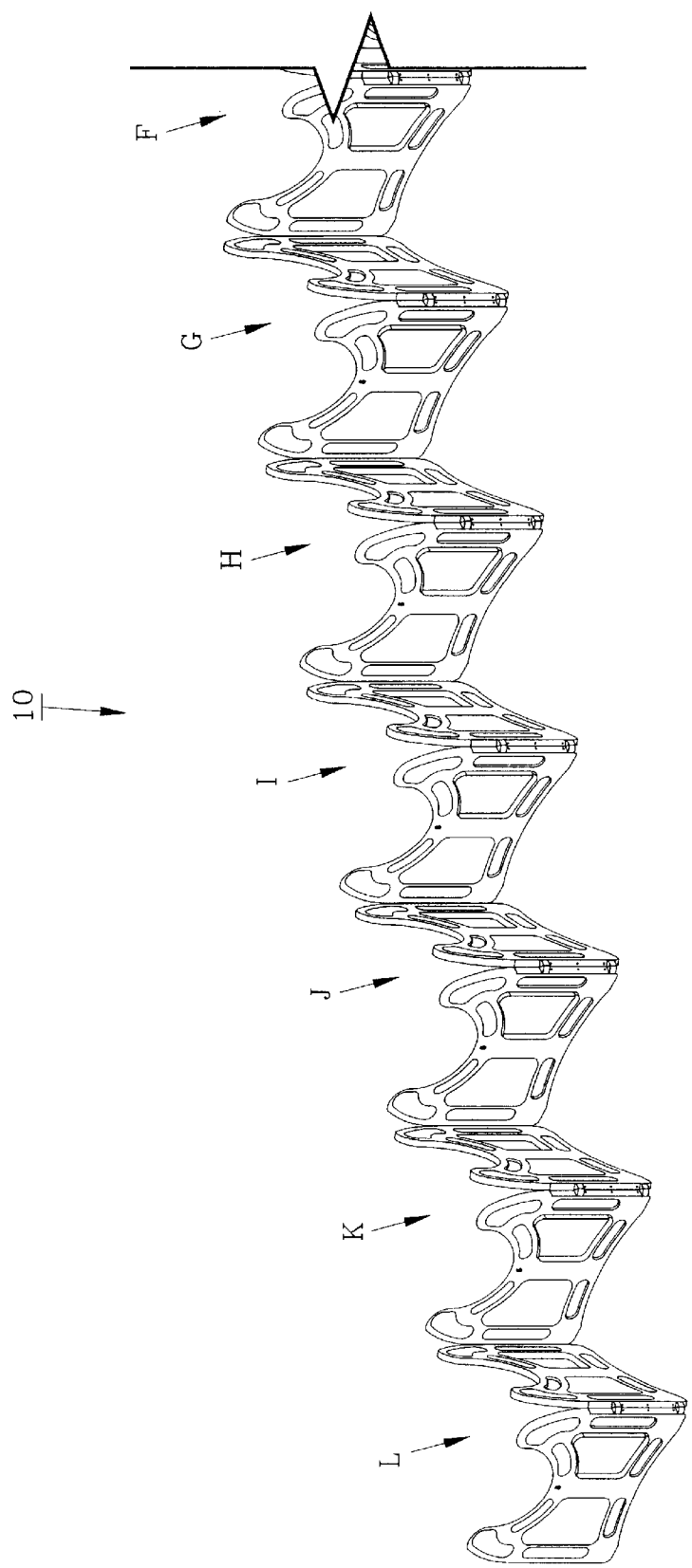
FIG. 3 depicts a fragmented, miniature view of the sewer hose support of FIG. 1 in an opened posture.

In use, sewer hose support 10 is expanded or opened manually as each arch is attached along its side as shown in FIG. 2 with hinge 40. Preferred arch support 10 can be opened as seen in FIG. 3 to support a sewer hose of approximately ten feet (3.048 m) in length, providing a drop along its length from arch pair A to arch pair L of approximately 3⅛ inches (7.94 cm). While preferred arch support 10 includes twelve pairs of arches A–L, an arch support (not seen) to support a sewer hose having a length of 15' (4.572 m) could likewise be formed utilizing three identical arches 12 rather than two as seen in FIG. 1 for each pair (A–L) for a total of thirty-six arches. In another embodiment of the invention (not shown) a hose support for a sewer hose having al length of twenty feet (6.096 m) could be manufactured by doubling the pairs of identical arches, for example two pairs of pair A, two pairs of pair B, two pairs of pair C, etc. for a total of forty-eight arches. By doubling the arch pairs, a sewer hose support for a sewer hose of approximately twenty feet (6.096 m)in length can be manufactured. As explained, by varying the number of arches or arch pairs, an expandable sewer hose support can be made using only twelve different arches (12–23) as by injection molding, by simply increasing or decreasing the number of identical arches used in the hose support.

Figure 4:
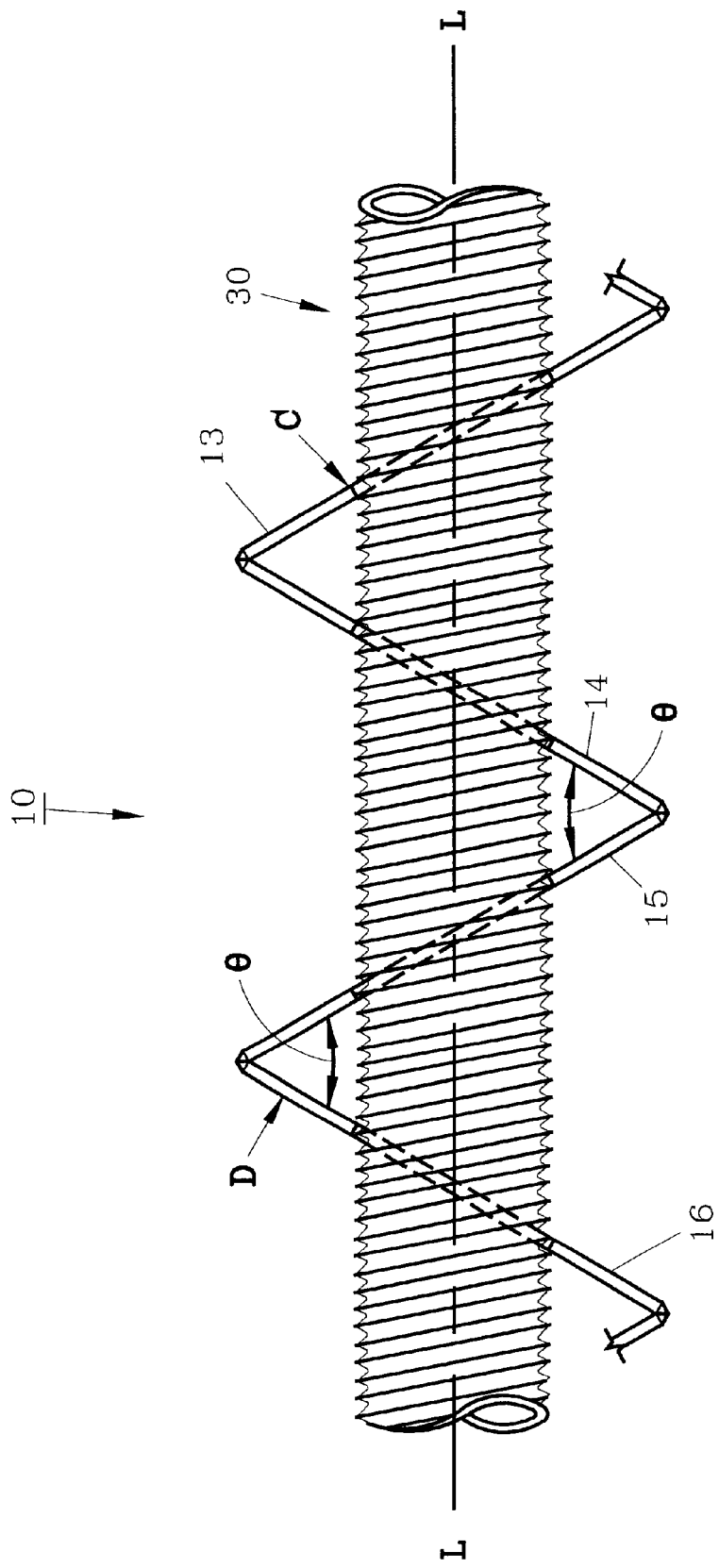
FIG. 4 illustrates an enlarged top sectional view of a flexible sewer hose positioned in the hose support as seen in FIG. 3.
Figure 7:
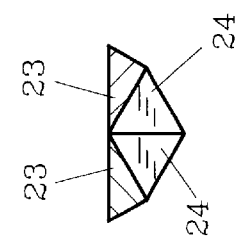
FIG. 7 shows the stops enlarged as seen along lines 7—7 of FIG. 2.
Figure 6:
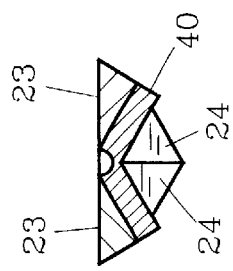
FIG. 6 pictures the hinge enlarged as shown along lines 6—6 of FIG. 2.
Figure 5:
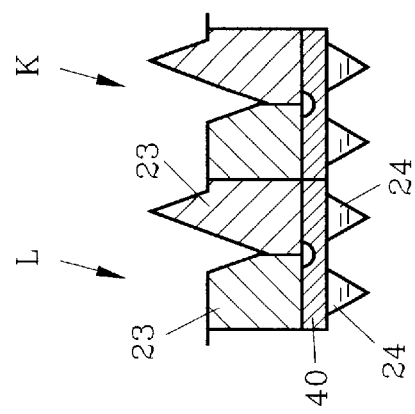
FIG. 5 features an enlarged cross-sectional view of two pairs of arches substantially along lines 5—5 of FIG. 1.

A typical arch pair L with arches 23 is shown in FIG. 2 joined by hinge 40 (shown enlarged in FIGS. 5 and 6). Polymeric hinge 40 is affixed to each arch 23 by conventional ultrasonic welding. As further shown in FIGS. 2, 5, 6 and 7, stops 24, 25 affixed to the sides of arches 23 prevent arch pair L from opening more than 60° to thereby create an adequate opening for each cradle (26 in FIG. 2) to allow sewer hose 30 (shown in FIG. 4) to be positioned therein. Each arch 23 of pair L include a cradle 26, legs 27, 27' and a lower lateral brace 28. As further seen, cradle 26, legs 27, 27' and brace 28 are preferably, integrally formed such as by injection molding of suitable polymeric material, preferably polypropylene to provide a rigid, durable arch for sewer hose support 10.

In FIG. 4, a top view of a section of opened support 10 is shown with arch pairs C and D seen engaging linear sewer hose 30. Arch pairs C and D are opened at an angle ø of approximately 60° from the longitudinal axis L—L of sewer hose 30. This angle provides a longer length of contact between sewer hose 30 and the top of each cradle, thus providing better support without deforming sewer hose 30 during heavy flow therethrough.

As would be understood, sewer hose support 10 may be placed in other than a linear configuration if necessary by opening selected arch pairs less than 60° to form an "S" curve, or other shape (not shown) as seen from above, should conditions so dictate.

Preferred arch support 10 is durable and simple to use by unskilled persons and allows a simple yet effective method of proper sewer hose 30 drainage.

The illustrations and examples provided herein are for explanatory purposes and are not intended to limit the scope of the appended claims.

We claim:

1. A support for a sewer hose comprising: a plurality of arches, said arch each having a pair of legs, a cradle, said cradle attached to said legs, a plurality of hinges, said hinges attached to the sides of adjacent legs, a plurality of pairs of stops, said stops attached to said hinges whereby said arches can be expanded by opening said hinges for supporting the sewer hose and can be collapsed for storage purposes.

2. The support of claim 1 wherein each of said arches further comprising a brace, said brace connected to each of said legs below said cradle.

3. The support of claim 1 wherein said arches are formed from plastic.

4. The support of claim 1 wherein said plurality of arches comprises pairs of identical arches.

5. The support of claim 1 wherein said plurality of arches comprises pairs of identical arches, each of said pairs of arches of different heights.

6. The support of claim 5 wherein each of said pairs of arches are formed from plastic.

7. The support of claim 5 wherein said pairs of arches comprises twelve pairs.

8. The support of claim 1 wherein each of said plurality of arches are hingedly joined to another to extend said support while in use and to collapse said support for storage.

9. The support of claim 8 wherein said arches support the sewer hose at an angle to bias the same when said support is extended.

10. The support of claim 8 wherein said arches are in parallel, side-by-side relation when said sewer hose support is collapsed.

11. A support for an RV sewer hose to maintain the sewer hose in a biased posture comprising: a plurality of adjacent arches, a plurality of hinges, said hinges positioned on the side of adjacent arches, a plurality of stop pairs, said stop pairs positioned on adjacent arches to limit the openings of said hinges, each of said arches comprising a hose cradle, a pair of legs, each of said legs attached to said cradle along different sides thereof, and a lateral brace, said lateral brace attached to each of said legs below said cradle.

12. The support of claim 11 wherein each of said arches is hingedly joined to an adjacent arch.

13. The support of claim 12 wherein each of said arches are hingedly joined along a leg.

14. The support of claim 12 wherein each of said arches are hingedly joined to an adjacent arch along adjacent sides thereof.

15. The support of claim 11 wherein said stop pairs limit the hinge opening to 60°.

\* \* \* \* \*